United States Patent [19]
Hekimian

[11] 3,708,741
[45] Jan. 2, 1973

[54] D.C. TO D.C. CONVERTER FOR CONNECTION ACROSS TELEPHONE LINES

[75] Inventor: Norris C. Hekimian, Rockville, Md.

[73] Assignee: Hekimian Laboratories, Inc., Rockville, Md.

[22] Filed: June 21, 1971

[21] Appl. No.: 154,726

[52] U.S. Cl. .....................321/15, 179/1 MN, 321/2, 329/150, 329/192, 307/2

[51] Int. Cl. ..............H02m, H04m 1/00, H03d 1/16

[58] Field of Search ........321/1, 4, 15; 329/150, 204, 329/192; 331/71, 185; 324/119, 120; 179/175.2 C, 1 MN; 307/1, 2

[56] References Cited

UNITED STATES PATENTS

| | | | |
|---|---|---|---|
| 3,234,450 | 2/1966 | Jennings | 321/2 |
| 3,281,689 | 10/1966 | Schneider et al. | 324/119 X |
| 3,593,042 | 7/1971 | Cook | 331/71 X |
| 3,243,683 | 3/1966 | Ackley | 321/15 X |
| 3,026,383 | 3/1962 | Englander | 179/1 MN |

*Primary Examiner*—William H. Beha, Jr.
*Attorney*—Rose & Edell

[57] ABSTRACT

D.C. supervisory signals control tones and audio signals appearing across a pair of balanced floating telephone lines are converted to permit processing by a single-ended grounded system. The converter circuit includes a high-impedance diode bridge full wave rectifier connected across the floating telephone lines and feeding a self-excited oscillator with an output signal amplitude substantially proportional to the D.C. voltage across the floating lines. The output signals from the rectifier and oscillator are passed through an isolation transformer to a single-ended detector which restores the supervisory signal D.C. level. The relatively high D.C. level of the supervisory signal acts to forward bias the rectifier and detector to pass the relatively low level audio signal and touch tones without distortion.

9 Claims, 1 Drawing Figure

PATENTED JAN 2 1973
3,708,741
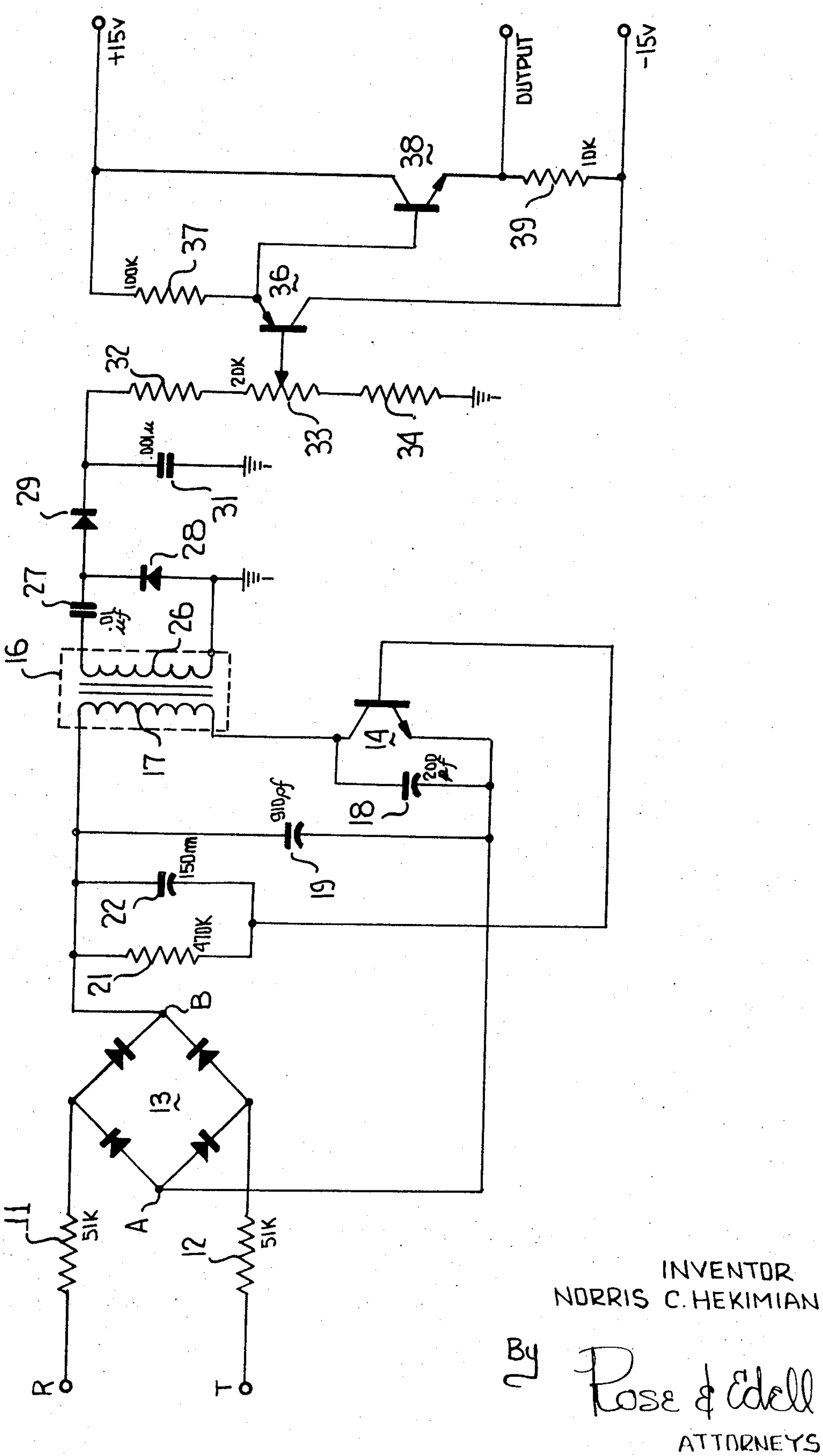
INVENTOR
NORRIS C. HEKIMIAN
By Rose & Edell
ATTORNEYS

D.C. TO D.C. CONVERTER FOR CONNECTION ACROSS TELEPHONE LINES

BACKGROUND OF THE INVENTION

The present invention relates to D.C. to D.C. converter circuits and, more particularly, to circuits employed to pick up both supervisory and audio signals appearing across a pair of floating telephone lines without adversely affecting the lines.

It is becoming commonplace to connect monitoring devices across telephone lines. In some cases these monitoring devices are employed by the telephone subscribers themselves to monitor telephone usage. For example, the "Dialed Number Recorder," Model 51, manufactured by Hekimian Laboratories in Rockville, Maryland, can be connected across the floating R (ring) and T (tip) lines of a subscriber telephone set and provide a printed record of the time, date, and telephone number of every call made from that set. In addition, the "Dialed Number Recorder" provides an audio signal suitable for application to a tape recorder for the purpose of recording conversations. Of course, this equipment may also be used in surveillance work by law enforcement agencies without the knowledge of the subscriber.

Monitoring equipment of the type described must be able to discern different D.C. levels corresponding to supervisory functions such as "on hook" and "off hook" conditions. It must also be capable of picking up audio signals such as conversation, touch tone, etc., appearing across the floating T and R lines. Moreover, since the monitoring equipment is referenced to ground and the T and R lines are floating, the equipment must be able to convert the floating D.C. and audio signals to a form suitable for use in a single-ended grounded system. On top of all of these requirements is the fact that the monitoring equipment must not appreciably load or otherwise adversely affect the T and R lines and must not distort the audio signals beyond the point of usefulness in the equipment.

The present invention, therefore, is concerned with providing a circuit which may be connected directly across the floating T and R lines of a telephone being monitored and which detects D.C. supervisory levels and passes audio signals without distortion. Prior art monitoring equipment of the type described has been unable to monitor both D.C. and audio with a single circuit. Most such equipment, for example, employ a relay connected across the R and T lines, or between the R or T line and the relatively noisy S (sleeve) line, in order to detect on-hook versus off-hook D.C. levels. These relays, in most cases, load the telephone lines to a relatively high degree. Moreover, these relays tend to chatter, have slow response times, and have relatively short operating lives. Other systems monitor on-hook and off-hook states with AC coupling circuits which act to sharply differentiate the D.C. signal so that only D.C. level transitions can be detected. This approach requires memory circuitry to keep track of which supervisory state was last assumed by the monitored telephone. In neither case (relay or differentiation circuit) can the D.C. level sensing circuit pass audio frequencies without distortion, so that a separate audio circuit must be provided.

It is therefore an object of the present invention to provide a circuit which is connected across a pair of floating telephone lines, without adversely affecting the lines, to convert supervisory D.C. levels to a single-ended D.C. signal, and which passes audio signals without distortion.

It is a further object of the present invention to convert all signals appearing across the floating T and R lines at a telephone system subscriber station to a single-ended signal referenced to ground, without loading or otherwise adversely affecting the lines and without distorting the converted signals.

It is still another object of the present invention to provide a circuit capable of converting a D.C. signal appearing across a pair of floating lines to a single-ended D.C. signal referenced to ground, wherein the circuit is additionally capable of passing audio signals without distortion.

BRIEF DESCRIPTION OF THE DRAWING

The above and still further objects, features and advantages of the present invention will become apparent upon consideration of the following detailed description of one specific embodiment thereof, especially when taken in conjunction with the accompanying drawings, wherein:

The single FIGURE is a schematic diagram of a circuit embodying the principles of the present invention.

DESCRIPTION OF PREFERRED EMBODIMENT

Referring to the single FIGURE of the drawing in detail, the circuit of the present invention includes a pair of input terminals, R and T, arranged to be connected to the R and T lines, respectively, of a monitored telephone. The input terminals are connected, through respective resistors 11, 12 to opposite input junctions of a diode bridge full wave rectifier circuit 13 of standard configuration. The presence of the full wave rectifier permits terminals R and T to be interchanged when they are connected to the monitored telephone lines; in other words, the user of the circuit does not have to observe polarity when connecting the circuit into the telephone system. Resistors 11 and 12 are of relatively high value (for example, 51 K ohms each to provide 100 K ohms across terminals R and T), so that the R and T lines of the monitored telephone are negligibly loaded.

The opposite output junctions of bridge rectifier 13 are connected across a self-excited LC oscillator including NPN transistor 14. Specifically, the emitter of transistor 14 is connected directly to one output junction A of rectifier 13. The other output junction of the rectifier is connected to the collector of transistor 14 via the primary winding 17 of isolation transformer 16. A capacitor 18 is connected across the collector and emitter terminals of transistor 14. A second capacitor 19 is connected directly across the series combination of primary winding 17 and the collector-emitter circuit of transistor 14, or, in other words, across output junctions A and B of rectifier 13. A resistor 21 and capacitor 22 are connected in parallel between the base of transistor 14 and junction B of the rectifier.

The circuit as thus far described is powered solely by the voltages appearing across the R and T lines of the monitored telephone. The D.C. voltage applied to the circuit from terminals R and T is applied to the base-emitter circuit of transistor 14, causing the amplitude of oscillation to follow the input D.C. voltage in a substantially proportional fashion. For the component values listed in the drawing (by way of example only), and with a 2N930 transistor employed as transistor 14, the oscillation frequency is approximately 750 KHz.

Transformer 16 is preferably a 70:40 step down transformer and isolates the detector and following circuitry from the telephone lines. The secondary winding 26 of transformer 16 has one terminal connected directly to ground and the other terminal connected to a capacitor 27. The latter, in turn, is connected to a junction between the cathode of diode 28 and anode of diode 29. The anode of diode 28 is returned directly to ground. The cathode of diode 29 is connected to ground via a capacitor 31 and also through three series-connected resistors 32, 33 and 34. Resistor 33 is a potentiometer whose wiper arm is connected to the base of a PNP transistor 36 having an emitter connected to +15 volts D.C. through resistor 37 and a collector connected directly to −15 volts D.C. The emitter of transistor 36 is also connected directly to the base of NPN transistor 38 which has its collector connected to +15 volts D.C. and its emitter connected to −15 volts D.C. through a resistor 33.

Diode 28 acts as a clamp and references all signals passed by transformer 16 to ground. Diode 29 and capacitor 31 serve as a diode detector circuit for the oscillatory signal applied to primary winding 17 by the self-excited LC oscillator. The output signal from the detector is a D.C. signal at a level dependent upon the amplitude of detected oscillation.

Resistors 32, 33 and 34 serve a voltage division function with potentiometer 33 providing signal level adjustment for the signal applied to the amplifier circuit composed of transistors 36 and 38. The output signal from the circuit is obtained between the emitter of transistor 38 and ground. This amplifier circuit, with the component values shown and employing transistor types 2N5138 and 2N3566 for transistors 36 and 38, respectively, provides controllable amplification in a frequency range from D.C. to above 4 KHz.

From the foregoing description it will be appreciated that D.C. levels appearing across terminals R and T are first converted to an oscillatory signal having an amplitude proportional to the applied D.C. level. The detector circuit, completely isolated from the telephone lines by transformer 16, then reconverts the oscillatory signal to a D.C. signal having a level proportional to the amplitude of oscillation.

Audio signals, such as conversation and touch-tone, "ride" on the D.C. signal and are therefore passed by the circuit without distortion. Specifically, the D.C. level appearing across lines R and T is always significantly larger than the peak amplitude of the audio signals. This is so because the subscriber telephone is powered by the D.C. voltage and cannot produce a larger voltage than that supplied. Typically, the "on-hook" D.C. voltage appearing across the R and T lines is between 24 and 48 volts D.C. When the subscriber's telephone is taken "off-hook," this voltage drops to approximately 6 volts D.C. At either D.C. level, the forward-biased diodes in rectifier 13 and detector 29 pass the low level audio signals appearing on the R and T lines.

It should be noted that the relatively high frequency of the self-excited oscillator in the primary circuit is substantially filtered out by capacitor 31. Any residue ripple from this high frequency signal is further attenuated by the amplifier circuit (transistors 36, 38) which has a low pass frequency characteristic.

It should also be noted that the subscriber ring signal (120 volts peak-to-peak at 16 ⅔ or 20 Hz) is distorted in passing through the circuit of the present invention because the ring signal amplitude is significantly greater than the "on-hook" D.C. level of approximately 24 to 48 volts. However, the ring condition is readily recognized, because of its distortion, and therefore its presence can be readily monitored at the output terminal of the disclosed circuit. Moreover, the ring signal can be present only during an "on-hook" condition, so that it cannot interfere with monitoring of the audio signals or D.C. levels.

The component values and model numbers indicated in the drawing and described above are by way of example only and variations thereof are possible with the scope and concept of the present invention. Component changes, of course, may affect the oscillation frequency of transistor 14, or the frequency responses of the diode detector or output amplifier. In certain instances, of course, where the nature of the input signal differs from that on standard telephone lines, these parameters and the controlling components might have to change. This would occur where the circuit of the present invention is utilized in other than a telephone-monitoring environment.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A circuit for passing D.C. and audio signals appearing across a balanced pair of floating telephone lines, said circuit comprising:
   - a pair of input terminals;
   - a diode bridge full wave rectifier having a pair of input junctions and first and second output junctions;
   - first and second equal resistors, each connected between a respective input terminal and input junction;
   - a transistor having collector, emitter and base electrodes;
   - an isolation transformer having a primary winding and a secondary winding;
   - means connecting said primary winding and said collector and emitter electrodes in series across the first and second output junctions of said rectifier;
   - capacitor means connected in circuit with said primary winding and said transistor to provide an LC oscillator having a frequency of oscillation dependent upon the voltage applied to said base electrode;
   - means coupling said base electrode to said first output junction of said rectifier;
   - a detector including a diode and capacitor connected in series in the order recited between one end of said secondary winding and ground; and means directly coupling the other end of said secondary winding to ground.

2. A circuit for use in monitoring DC supervisory signals and relatively low frequency signals appearing across a pair of ungrounded lines, wherein the peak amplitude of said low frequency signals is less than the amplitude of said DC signals, said circuit comprising:

ungrounded high impedance input means for receiving said DC and low frequency signals from said ungrounded lines;

an ungrounded self-excited oscillator for providing an oscillatory signal having a relatively high oscillation frequency and an amplitude of oscillation which is a known function of the amplitude of a DC signal applied to said oscillator;

means for applying the received DC signal to said oscillator;

an isolation transformer for passing the received low frequency signal and said oscillatory signal;

a detector arranged to receive the oscillatory signal passed by said transformer for providing a DC ground-referenced signal at a level which is a specified function of the amplitude of said oscillatory signal; and output means for providing an output signal from said circuit which includes said low frequency signal passed by said transformer and said ground-referenced DC signal.

3. The circuit according to claim 2 wherein the frequency response of said detector is low-pass in nature such that said low frequency signals are passed substantially unaffected from said transformer through said detector to said output means.

4. The circuit according to claim 2 wherein said detector includes a diode connected in series between said isolation transformer and said output means, and wherein the amplitude of said oscillatory signal passed by said isolation transformer is sufficiently high to forward bias said diode for passage of said low frequency signal to said output means.

5. The circuit according to claim 2 wherein said high impedance input means comprises a diode bridge full wave rectifier and a high impedance connected in series between each of said ungrounded lines and a respective opposite junction of said bridge, and wherein the amplitude of said DC supervisory signals is sufficiently high to forward bias said bridge to pass said low frequency signals.

6. The circuit according to claim 5 wherein said detector includes a diode connected in series between said isolation transformer and said output means and wherein the amplitude of said oscillatory signal passed by said isolation transformer is sufficiently high to forward bias said diode for passage of said low frequency signal to said output means, and wherein the frequency response of said detector is low-pass in nature such that said low frequency signals are passed substantially unaffected through said detector.

7. The circuit according to claim 6 wherein said output means includes an amplifier with a low-pass frequency characteristic for passing said ground-referenced DC signal and said low frequency signal and attenuating signals at said relatively high frequency.

8. The circuit according to claim 7 wherein said pair of ungrounded lines are the ring and tip lines of subscriber telephone set.

9. The circuit according to claim 2 wherein said pair of ungrounded lines are the ring and tip lines of subscriber telephone set.

* * * * *